United States Patent Office 2,913,482
Patented Nov. 17, 1959

2,913,482

ADDUCTS OF FUMARATE ESTERS AND ALKENYL-SUBSTITUTED AROMATIC COMPOUNDS

Joachim Dazzi, Dayton, Ohio, assignor to Monsanto Chemical Company, St. Louis, Mo., a corporation of Delaware No Drawing. Application April 20, 1956
Serial No. 579,452

8 Claims. (Cl. 260—475)

This invention relates to high molecular weight adducts and more particularly provides new vinyl aromatic compounds having a plurality of carboxylate radicals, the process of producing the same, and vinyl chloride resins plasticized with the new compounds.

An object of the invention is the provision of new and useful polycarboxylates. Another object of the invention is the preparation of viscous polycarboxylates from certain vinyl-substituted aromatic hydrocarbons. Still another object of the invention is to provide for the coatings, snythetic resins and plastics, plasticizer, rubber and textile industries a new class of stable, viscous material having a plurality of carboxylate radicals.

These and other objects of the invention hereinafter disclosed are provided by the following invention wherein there are prepared viscous adducts of (1) an ester selected from the class consisting of alkyl and alkoxyalkyl fumarates having from 1 to 8 carbon atoms in the alkyl radical and from 3 to 8 carbon atoms in the alkoxyalkyl radical and (2) vinyl-substituted aromatic hydrocarbons selected from the class consisting of styrene, ar-vinyltoluene, α-methylstyrene and dimeric α-methylstyrene, i.e., 2,4-diphenyl-4-methyl-1(or 2-)pentene. The ar-vinyltoluene may be a mixture of 2-, 3- or 4-vinyltoluene in any proportion or one of said isomers alone, ar indicating substitution in the aromatic nucleus.

Fumarates suitable for the present purpose are the simple alkyl diesters of fumaric acid, e.g., methyl, ethyl, isopropyl, n-propyl, n-butyl, tert-butyl, isoamyl, n-hexyl, n-heptyl, 2-ethylhexyl and n-octyl fumarate, the mixed alkyl diesters, e.g., ethyl methyl fumarate, isopropyl n-octyl fumarate, n-amyl tert-butyl fumarate, etc., the simple alkoxyalkyl fumarates such as bis(2-methoxyethyl), bis(3-ethoxy-n-propyl), and bis(4-butoxybutyl) fumarates; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol mono-ether such as ethyl 2-ethoxyethyl fumarate or n-amyl 3-propoxy-2-propyl fumarate.

While I do not understand the mechanism by which addition of the fumarate to the present vinyl aromatic compounds occurs, it probably takes place at the carbon atom or atoms which are α- to the carbon atoms attached to the olefinic double bond of the vinyl aromatic compound. The olefinic double bonds of the hydrocarbon remain intact, whereas those of the fumarate are saturated in the addition reaction. Depending upon the reaction conditions and the nature of the fumarate and vinyl aromatic hydrocarbon, from 1 to 3 moles of fumarate add to said hydrocarbon. Hence the present compounds have from 2 to 6 carboxylate groups, two groups being present in a 1:1 hydrocarbon-fumarate addition product, 4 carboxylate radicals being present in a 1:2 hydrocarbon-fumarate adduct, etc. The general formula of the presently provided adducts is:

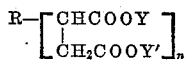

in which R is selected from the class consisting of the styrene, α-methylstyrene and dimeric α-methylstyrene residues, Y and Y' are alkyl radicals of from 1 to 8 carbon atoms and n is an integer of 1 to 3.

Reaction of one of the present vinyl aromatic hydrocarbons with the alkyl fumarate to form viscous adducts takes place readily by heating a mixture of the fumarate and said hydrocarbon in the presence or absence of an inert diluent or solvent at ordinary or superatmospheric pressures. When operating at atmospheric pressure, temperatures of from, say, 125° C. to 300° C., and preferably of from 150° C. to 225 C., are used. The number of carboalkoxy groups introduced into the vinyl hydrocarbon depends upon the nature of said product, upon the nature of the individual fumarate used, and upon the reaction conditions employed. Generally, operation within the higher temperature ranges, i.e., at temperatures of above, say, 210° C. and below the decomposition point of any of the reactants, leads to introduction of more carboalkoxy groups than does operation at the lower temperatures. The number of carboalkoxy groups introduced also depends upon the individual fumarate employed. Uusally alkyl fumarates having 4 or 5 carbon atoms in the alkyl radical are more reactive than the higher alkyl fumarates. In view of the effect of the reaction conditions and nature of the fumarates upon the extent of introduction of carboalkoxy groups, it is recommended that for each initial run there be experimentally determined the operating conditions which should be observed for obtaining the desired degree of introduction of such groups.

The quantity of fumarate introduced into the vinyl aromatic hydrocarbon will also depend upon its availabiilty in the reaction mixture. Obviously, for the formation of adducts in which at least one mole of the fumarate has added to one mole of the unsaturated hydrocarbon, the equivalent amount of fumarate must be present in the reaction mixture.

Since the presently useful fumarates are miscible with the hydrocarbon reactant under the reaction conditions employed, no extraneous solvent or diluent need be employed. However, in some instances, it may be advantageous to work with a solution of the hydrocarbon in an inert, extraneous diluent or solvent, e.g., a liquid hydrocarbon or a liquid derivative thereof, such as a high-boiling aliphatic hydrocarbon, e.g., kerosene. When operating at atmospheric pressure such diluent is generally removed before reaction of said vinyl hydrocarbon with the fumarate occurs, due to the high temperatures used. For successful reaction, the diluent may or may not be present.

The present vinyl aromatic hydrocarbon-alkyl fumarate adducts are stable, high-boiling viscous liquids which are advantageously employed for a variety of industrial purposes, for example, as textile and paper treating agents, as lubricant additives, and as synthetic resins for use in varnishes, asphaltic compositions, etc. They are particularly valuable as plasticizers for vinyl chloride polymers. The present adducts are completely compatible with such polymers and show no exudation of plasticizer even at plasticizer contents of up to 50 percent. Although the quantity of plasticizer will depend upon the particular polymer to be plasticized and upon its molecular weight, it is generally found that compositions having from 5 percent to 50 percent by weight of the present plasticizer will, in most cases, be satisfactory for general utility. The good flexibility of the plasticized compositions increases with increasing plasticizer concentration.

The invention is further illustrated but not limited by the following examples:

Example 1

A mixture consisting of 118 g. (1 mole) of α-methylstyrene, 456 g. (2 moles) of butyl fumarate and about 1.0 g. of di-tert-butylcatechol (as polymerization inhibitor) was heated at 220° C. for 8 hours in a rocking autoclave. The refractive index of the reaction mixture rose from an initial $n_D^{25}$ of 1.4638 to 1.4822. Distillation of the resulting reaction mixture to remove material boiling below 205° C./1.8 mm. gave as residue 419 g. of the viscous light yellow α-methylstyrene-dibutyl fumarate adduct, $n_D^{25}$ 1.4910 and having an iodine number of 8.56 and 8.63 in two different determinations. Analysis of said residue showed it to be a product in which one mole of a α-methylstyrene is combined with two moles of butyl fumarate, said residue having the following analysis:

|           | Found | Calcd. for $C_{33}H_{50}O_8$ |
|-----------|-------|-------------------------------|
| Percent C | 68.03 | 69.02                         |
| Percent H | 8.44  | 8.70                          |

Example 2

A mixture consisting of 157 g. (1.5 moles) of styrene, 684 g. (3 moles) of dibutyl fumarate, and a polymerization inhibitor consisting of 2.0 g. of di-tert-butylcatechol and 1.0 g. of sulfur was heated in a rocking autoclave for 8 hours at 220° C. During the heating period the refractive index of the reaction mixture rose from $n_D^{25}$ 1.4638 to 1.4832. Removal of material boiling below a pot temperature of 230° C./2 mm. gave as residue 650 g. of a yellow, viscous adduct, $n_D^{25}$ 1.4943 which analyzed 70.13% C and 8.72% H. Since the calculated values for a 1:1 styrene-butyl fumarate adduct are 72.3% C and 8.45% H and those of a 1:2 styrene-butyl fumarate adduct are 68.7% C and 8.57% H, said residue represents a substantially equimolar mixture of 1:1 and 1:2 styrene-butyl fumarate adducts.

Example 3

This example describes the preparation of an addition product from butyl fumarate and dimeric α-methylstyrene. The dimeric α-methylstyrene was a commercially available product which was a mixture reputed to consist of about 43% 2,4-diphenyl-4-methylpentene-1, 49% of 2,4-diphenyl-4-methylpentene-2 and about 8% of indene-type hydrocarbons. A mixture consisting of 118 g. (0.5 mole) of the dimeric α-methylstyrene $n_D^{25}$ 1.5677 and 456 g. (2 moles) of butyl fumarate was brought to a temperature of 220° C. in about 30 minutes and heating at a temperature of from 218–235° C. was continued for about 5.5 hours. During the heating period 1.0 g. of di-tert-butylcatechol (as polymerization inhibitor) was added to the reaction mixture in several portions. Distillation of the resulting reaction mixture to remove material boiling below 205° C./1.5 mm. gave as residue 318 g. of an adduct of butyl fumarate and the dimeric α-methylstyrene, $n_D^{25}$ 1.4825. It was found to have a saponification equivalent of 161.2 (average of 2 values), which value corresponds to an adduct in which one mole of the dimeric α-methylstyrene is combined with an average of 2.5 moles of butyl fumarate.

Example 4

A mixture consisting of 118 g. (1 mole) of a commercially available ar-vinyltoluene, $n_D^{25}$ 1.5386, 520 g. (2 moles) of 2-ethoxyethyl fumarate, and as inhibitor 2.0 g. of di-tert-butylcatechol and 1.0 g. of sulfur was heated in an autoclave at 220° C. for 8 hours. During this time the refractive index of the reaction mixture rose from 1.4685 to 1.4850. The reaction product was transferred to a distilling vessel, the autoclave was washed out with acetone, and the combined product and washings were distilled to remove 169 g. of the unreacted fumarate $n_D^{25}$ 1.4512. There was thus obtained as residue 462 g. of the substantially pure 1:1 vinyltoluene-2-ethoxyethyl fumarate adduct, $n_D^{25}$ 1.5001, having a saponification value of 196 as against 189, the theoretical value.

Example 5

Sixty parts by weight of polyvinyl chloride and 40 parts by weight of the α-methylstyrene-butyl fumarate adduct of Example 1 were mixed on a milling roll to a homogeneous blend. During the milling there was observed substantially no fuming or discoloration. A molded sheet of the mixture was clear and transparent and substantially colorless. Testing of the molded sheet for low temperature flexibility by the Clash-Berg method gave a value of 0.0° C. Testing of the volatility characteristics of the molded resin by a modified carbon absorption method of the Society of Chemical Industry gave a value of 1.7%. When subjected to heat at a temperature of 325° F. for a period of 30 minutes the clarity and color of the molded product was substantially unchanged. Testing of the water resistance of the plasticized material by immersing in water for 24 hours showed a solids-loss of only 0.01 per cent and an 0.34 percent water absorption value.

When the dimeric α-methylstyrene-butyl fumarate adduct of Example 3 was tested as a plasticizer for polyvinyl chloride employing the proportions and procedure used above for the adduct of Example 1, there was obtained a clear, compatible plasticized material having low temperature flexibility value of minus 4.9° C., a volatility value of 2.5%, a solids-loss of 0.18% and a water absorption value of 0.58%. The kerosene resistance of a molded test specimen of polyvinyl chloride plasticized with 40 percent by weight of the adducts of Examples 1 and 3 was determined as follows:

A 2" diameter 40 mil. disc was suspended in a 50° C. oven for a 3-hour conditioning period to eliminate water, then cooled and weighed. The so-conditioned sample was then immersed in 400 ml. of kerosene for a period of 24 hours, at 27° C. The sample was then removed from kerosene, blotted dry and suspended in a force-draft 80° C. oven for 4 hours. The sample was then cooled and weighed. The percent loss in weight was reported as the kerosene extraction value. There was thus obtained a kerosene extraction value of 0.1% for the α-methylstyrene adduct of Example 1 and a value of 0.5% for the dimeric α-methylstyrene adduct of Example 3.

Instead of the butyl fumarate adducts, adducts of styrene, α-methylstyrene, dimeric α-methylstyrene or vinyltoluene and other alkyl fumarates, e.g., methyl or 2-ethylhexyl fumarate or alkoxyalkyl fumarates such as 3-ethoxypropyl or 4-butoxybutyl also give good results as polyvinyl chloride plasticizers. Thus by employing 40 parts by weight of the adduct of methyl or ethyl fumarate and 2-, 3- or 4-vinyltoluene or the adduct of 2-butoxyethyl or 2-methoxypropyl fumarate and 60 parts by weight of a vinyl chloride-vinyl acetate copolymer known to the trade as "Vinylite" there are obtained clear, colorless compositions of very good flexibility and stability.

While the above example shows only compositions in which the ratio of plasticizer to polymer content is 40:60, this ratio being employed in order to get comparable values, the content of adduct to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of adduct based on the total weight of the plasticized composition yielding desirable products.

Although the invention has been described particularly with reference to the use of the present adducts as plasticizers for polyvinyl chloride, they are advantageously employed also as plasticizers for copolymers of vinyl chloride, for example, the copolymers of vinyl chloride with vinyl acetate, vinylidene chloride, etc. Preferaly, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes, it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized resins does not impair the valuable properties of the present esters. The present adducts are of general utility in softening vinyl chloride polymers. They may be used as the only plasticizing component in a compounded vinyl chloride polymer or they may be used in conjunction with other plasticizers.

What I claim is:

1. An adduct of the formula

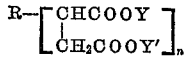

in which R is selected from the class consisting of the styrene, vinyltoluene, α-methylstyrene and dimeric α-methylstyrene residues, Y and Y' are selected from the class consisting of alkyl radicals of from 1 to 8 carbon atoms and alkoxyalkyl radicals of from 3 to 8 carbon atoms, and $n$ is an integer of 1 to 3.

2. The adduct defined in claim 1 further characterized in that R is the styrene residue and Y and Y' are alkyl radicals of from 1 to 8 carbon atoms.

3. The adduct defined in claim 1 further characterized in that R is the α-methylstyrene residue and Y and Y' are alkyl radicals of from 1 to 8 carbon atoms.

4. The adduct defined in claim 1 further characterized in that R is the dimeric α-methylstyrene residue and Y and Y' are alkyl radicals of from 1 to 8 carbon atoms.

5. The adduct defined in claim 1 further characterized in that R is the styrene residue and Y and Y' are butyl radicals.

6. The adduct defined in claim 1 further characterized in that R is the α-methylstyrene residue and Y and Y' are butyl radicals.

7. The adduct defined in claim 1 further characterized in that R is the dimeric α-methylstyrene residue and Y and Y' are butyl radicals.

8. The adduct defined in claim 1 further characterized in that R is the ar-vinyltoluene residue and Y and Y' are 2-ethoxyethyl radicals.

References Cited in the file of this patent

UNITED STATES PATENTS

| | | |
|---|---|---|
| Re. 23,518 | Morris et al. | July 1, 1952 |
| 2,442,558 | D'Aleio | June 1, 1948 |
| 2,598,636 | Dazzi | May 27, 1952 |
| 2,667,504 | Dazzi | Jan. 26, 1954 |
| 2,687,428 | Dazzi | Aug. 24, 1954 |
| 2,687,429 | Dazzi | Aug. 24, 1954 |
| 2,703,791 | Butler | Mar. 8, 1955 |
| 2,709,691 | Dazzi | May 31, 1955 |
| 2,752,387 | Rehberg | June 26, 1956 |
| 2,769,834 | Dazzi | Nov. 6, 1956 |
| 2,782,227 | Dazzi | Feb. 19, 1957 |
| 2,782,229 | Dazzi | Feb. 19, 1957 |
| 2,786,041 | Dazzi | Mar. 19, 1957 |